United States Patent
O'Neil

(10) Patent No.: US 9,615,433 B1
(45) Date of Patent: Apr. 4, 2017

(54) OCCUPANCY SENSOR WITH A BYPASS PHOTO SENSOR

(71) Applicant: EUControls Corporation, Gardena, CA (US)

(72) Inventor: Tom O'Neil, Torrance, CA (US)

(73) Assignee: EUControls Corporation, Gardena, CA (US)

( * ) Notice: Subject to any disclaimer, the term of this patent is extended or adjusted under 35 U.S.C. 154(b) by 0 days.

(21) Appl. No.: 15/059,019

(22) Filed: Mar. 2, 2016

(51) Int. Cl.
| | |
|---|---|
| *H05B 37/02* | (2006.01) |
| *F21V 23/04* | (2006.01) |
| *F21V 23/00* | (2015.01) |
| *F21V 23/06* | (2006.01) |
| *F21V 23/02* | (2006.01) |

(52) U.S. Cl.
CPC ....... *H05B 37/0227* (2013.01); *F21V 23/003* (2013.01); *F21V 23/02* (2013.01); *F21V 23/0471* (2013.01); *F21V 23/06* (2013.01); *F21V 23/001* (2013.01)

(58) Field of Classification Search
CPC ............ H05B 37/0218; H05B 37/0227; H05B 37/0245; H05B 37/0272; H05B 37/0803; H05B 33/0854; Y02B 20/44; Y02B 20/46; Y02B 20/48; F21V 23/0442; F21V 23/0471; F21W 2111/027; F21Y 2101/00
USPC ... 315/149, 156, 159, 307, 312; 362/249.02, 362/806; 250/214 AL
See application file for complete search history.

(56) References Cited

U.S. PATENT DOCUMENTS

| | | | | |
|---|---|---|---|---|
| 5,495,385 | A * | 2/1996 | Hsiu ...................... | H01H 47/24 361/175 |
| 6,583,573 | B2 * | 6/2003 | Bierman ............... | H05B 39/042 250/214 AL |
| 7,569,802 | B1 * | 8/2009 | Mullins ............... | F21V 23/0442 250/205 |
| 8,143,567 | B2 * | 3/2012 | Williams .................. | G01J 1/04 250/214 AL |
| 8,853,965 | B2 * | 10/2014 | Bouws .................... | H05B 37/00 315/152 |
| 9,049,756 | B2 * | 6/2015 | Klusmann .......... | H05B 37/0218 |
| 9,146,153 | B2 * | 9/2015 | Lee ............. | G01J 1/02 |
| 9,544,975 | B2 * | 1/2017 | Giltaca .............. | H05B 37/0218 |
| 9,554,446 | B2 * | 1/2017 | Klein Swormink | ......... H05B 37/0218 |
| 2015/0061500 | A1* | 3/2015 | Yeh .................... | H05B 37/0227 315/149 |
| 2016/0066391 | A1* | 3/2016 | Delnoij .............. | H05B 37/0218 315/130 |

* cited by examiner

*Primary Examiner* — Haissa Philogene
(74) *Attorney, Agent, or Firm* — Clement Cheng

(57) ABSTRACT

A light with an occupancy sensor has a light fixture with a lamp and a power supply. The light fixture has a plurality of sidewalls defining a light fixture housing. An internal photo main sensor is mounted on a first sidewall of the light fixture. The internal main photo sensor is connected to a light controller and configured to send light sensor data to the light controller. An external bypass photo sensor is optionally mounted on a second sidewall of the light fixture. The external bypass photo sensor is configured to connect to the light controller and bypass the internal main photo sensor when the external bypass photo sensor is installed. The light controller is electrically connected to the external bypass photo sensor at least three contacts of the light sensor namely a first contact, a second contact and a third contact.

13 Claims, 2 Drawing Sheets

OCCUPANCY SENSOR WITH A BYPASS PHOTO SENSOR

FIELD OF THE INVENTION

The present invention is in the field of occupancy sensors.

DISCUSSION OF RELATED ART

A variety of photo sensors provide daylight harvesting features. An example of this is U.S. Pat. No. 6,583,573 by inventor Andrew Bierman and assigned to Rensselaer Polytechnic Institute, entitled Photosensor And Control System For Dimming Lighting Fixtures To Reduce Power Consumption, issued Jun. 24, 2003, the disclosure of which is incorporated herein by reference. Bierman teaches two separated units, a control unit to turn ON/OFF or dim lights and a wireless photocell unit to transmit light level data by wireless. Although the wireless photocell unit can be placed in any location and orientation within wireless range, it costs more for the wireless transmitter and receiver.

Another example is U.S. Pat. No. 5,495,385 by Peng H. Hsiu, entitled Fully Automatic, Photosensor-Controlled Time Switch Device, dated Feb. 27, 1996, the disclosure of which is incorporated herein by reference. This mechanical photo sensor automatic switches without a intelligent microcontroller. The photo sensor changes its resistance with ambient light intensity. At or below a certain resistance, the mechanical relay coil in series with the photo sensor can be energized to turn activate the relay and turn ON the light. The photo sensor is typically mounted on the device without options for external mounting to avoid reflected lights. The photo sensor monitors the ambient light level.

U.S. Pat. No. 7,569,802 by inventor Patrick Mullins, entitled Photosensor Control Unit For A Lighting Module, issued Aug. 4, 2009, the disclosure of which is incorporated herein by reference, is another example. Mullins uses multiple LED ceiling lights with the same narrow light wavelength range. The photo sensor is selected at different light wavelength to avoid detection of reflected LED light. The photo sensor is mounted on or about the LED lights, to detect the ambient lights other than the LED lights source wavelength to control the power ON or OFF.

U.S. Pat. No. 9,146,153 by inventor Hyun Young Lee and assigned to Raytron Co., entitled Photo Sensor Package For Lighting, dated Sep. 29, 2015, the disclosure of which is incorporated herein by reference, discusses a hybrid tiny circuit board that consists of a photo sensor, a microcontroller and timing function packaged in an Integrated Circuit (IC) chip format with an optical lens on top of it. The photo sensor is packaged into an IC chip to reduce system integration physical size.

Another example is U.S. Pat. No. 8,143,567 B2 assigned to Hubbell Inc., titled Ambient light control system, dated Mar. 27, 2012, the disclosure of which is incorporated herein by reference. An occupancy sensor has built-in LED lamps and a cavity on top to accept a removable light sensor, or photo sensor, to control light turning ON or OFF.

U.S. Pat. No. 9,049,756 assigned to Koninklijke Philips N.V., entitled Intelligent Lighting Control System And Network Comprising Multiple-Channel Photo Sensor, issued Jun. 2, 2015, the disclosure of which is incorporated herein by reference, is another example. Multiple sensors, including a PIR Motion sensor and photo cell or photo sensor lighting control system is connected in local network. An IR receiver is used to receive IR remote control or laser transmitter data.

United States Patent publication 20150061500 entitled Wireless Daylight and Occupancy Controlled Lighting Control Module and Lighting Apparatus, published Mar. 5, 2015, the disclosure of which is incorporated herein by reference, comprises a daylight photo sensor and occupancy PIR sensor controlled lighting system, with wireless control dimmable fluorescent ballast.

U.S. Pat. No. 8,853,965 entitled Luminary Control Systems, dated Oct. 7, 2014, the disclosure of which is incorporated herein by reference. A lighting control module (LCM) has a photo sensor and occupancy sensor, connected to gateway for wireless control and can measure the ambient light level and occupancy. The above references do not have multiple mounting locations for sensors or any teaching of modification of sensor orientation or any optional adjustable sensing radius and height.

SUMMARY OF THE INVENTION

An occupancy sensor can be installed in a light fixture with a lamp and a power supply. The light fixture has a plurality of sidewalls defining a light fixture housing. An occupancy sensor has an internal main photo sensor is mounted on a first sidewall of the light fixture. The internal main photo sensor is connected to a light controller and configured to send light sensor data to the light controller. An occupancy sensor has an external bypass photo sensor is optionally mounted on a second sidewall of the light fixture. The external bypass photo sensor cable assembly is configured to connect to the light controller and bypass the internal main photo sensor when the external bypass photo sensor is installed. The light controller is electrically connected to the external bypass photo sensor at least three contacts of the light controller namely a first contact, a second contact and a third contact.

The first contact is used to send light sensor data to the light controller and wherein the second contact and the third contact are electrically connected so that they are shorted relative to each other. The light controller is configured to sense the short between the second and third contact which activates a bypass of the internal main photo sensor by automatically deactivating the internal main photo sensor and switching over to the external bypass photo sensor, whereby the external bypass photo sensor is automatically detected when it is plugged in and automatically overrides the internal main photo sensor for monitoring.

The internal main photo sensor is a photo sensor and the bypass photo sensor is also an occupancy sensor. The occupancy sensor further includes: a built-in isolated AC-to-DC power converter and a motion detector having passive infrared (PIR), acoustic, ultrasonic, microwave sensor technology. The light controller is a main occupancy sensor controller with a microcontroller and firmware. The internal main photo sensor is a photo sensor mounted at least partially within the light fixture. The external bypass photo sensor includes a cable assembly with a connector. The at least three contacts are mounted on the connector.

A mechanical or solid-state relay can control output to the lighting device including by turning on and turning off alternating current line power. A pair of dimming wires control an industrial standard 0-10 VDC dimmable lighting device. Dimming is controlled by a built-in AC phase cut dimmer in either leading edge dimmer, also called a TRIAC dimmer or a trailing edge dimmer, also known as an electronics low voltage (ELV) dimmer.

The light fixture preferably has a light controller internal fixed location. The light controller may have a light controller housing upon which the occupancy sensor is mounted. The occupancy sensor includes an internal main photo sensor. An optionally installed external bypass photo sensor is external to the light controller and external to the light fixture housing. A direction of the light output of the lamp, and a direction of the external bypass photo sensor are preferably different, so that feedback flickering is reduced. The external bypass photo sensor is configured to add a photo sensor for daylight harvesting. The external bypass photo sensor is connected to the light controller, and the light controller lowers light output when an ambient light level is reached a pre-programmed light level. The internal main photo sensor is configured to add a photo sensor for daylight harvesting. The internal main photo sensor is connected to the light controller, and the light controller lowers light output when an ambient light level is reached a pre-programmed light level.

The optionally installed external bypass photo sensor senses ambient light level. The external bypass photo sensor has a connecting cable and connector for use with compatible sensors having a photo sensor built in and located in a fixed position. The sensors can be a motion detector such as passive infrared (PIR), an acoustic sensor, an ultrasonic transceiver (a transceiver containing both transmitter and receiver) or a microwave transceiver, or any other motion detection device. A optional external bypass photo sensor can be a light sensor only or some other configuration requiring a photo cell sensor input for operation.

The external bypass photo sensor can be plugged into a bypass connector mounted on the occupancy sensor housing, which automatically overrides the fixed position internal main photo sensor. The function of an external bypass photo sensor is twofold. First, it is used to avoid turning on the lighting devices whenever the ambient light level from sunlight or other light sources is already bright enough and above a pre-programmed light level set in foot candles or LUX units on the lighting controller. Second, it will force the lighting devices to be turned off whenever the ambient light level is above a second pre-programmed light level set in foot candles or LUX units on the lighting controller. The threshold levels to avoid the output lighting devices to be turned ON and to force the lighting devices to be turned OFF is either preset by a factory default value (in foot candles or LUX units), or programmable by the end user with potentiometer knobs on the occupancy sensor or via a remote control device.

In any application where the external bypass photo sensor is not plugged in, the occupancy sensor will work by using the internal main photo sensor which is the preinstalled internally and fixed location photo sensor. A highly reflective surface near or directly under the occupancy sensor, or the internal fixed location photo sensor is not ideally located for sensing the true ambient light level the lighting devices that are turned ON by the occupancy sensor may reflect strong lights into the internal main photo sensor. The internal main photo sensor can be confused when it receives a signal that can be either a true ambient light or a reflected signal emitted from the lighting devices controlled by the occupancy sensor. The erroneous feedback signal from the reflected light may cause the light output to flicker or cycle ON and OFF continuously, or be improperly triggered to an ON or OFF state.

An external bypass photo sensor is supplied as an optional accessory. The occupancy sensor will switch to the external bypass photo sensor automatically, when it detects the cable assembly of the external bypass photo sensor has been plugged into the bypass connector. The external bypass photo sensor assembly has only 3 wires and a connector for low cost and easy installation. The external bypass photo sensor on a cable assembly allows flexibility of installation orientation, usually pointing to the ambient light source such as the windows where sunlight is coming from. With the optionally installed external bypass photo sensor, the erroneous feedback problem can be resolved by proper placement of the external bypass photo sensor.

The following call out list of elements can be a useful reference for the element numbers of the drawings.
100 Occupancy Sensor Controller
101 Motion Detector
102 Input Signal Motion-Detect-In
103 Internal Photo Sensor Also Called The Internal Main Photo Sensor
104 First Resistor R1
105 Noise Filtering Capacitor C1
106 Input Signal Int-Photo-In
107 External Photo Sensor Cable Assembly also called External Bypass Photo Sensor Cable Assembly
108 External Bypass Photo Sensor
109 Three Wire Cable
110 Female Connector
111 Male Connector
112 Pull Up Resistor R2
113 A Noise Filtering Capacitor C2
114 Pull Up Resistor R3
116 External Photo Sensor Input Signal Ext-Photo-In
117 Plug In Input Signal Plug-In
118 Ac To Dc Converter
119 Lighting Output Controller
120 Plastic Lens
120 Plastic Nut

DETAILED DESCRIPTION OF THE PREFERRED EMBODIMENT

Glossary

A photo cell sensor or photo sensor is a light sensor that senses photons.
A transceiver is a transmitter that also has a receiver to transmit and receive signals.
A PIR sensor is a passive infrared sensor.
A TRIAC dimmer is a generic name for an alternating current triode dimmer.
An ELV dimmer is an electronics low voltage dimmer.
A PC board is a printed circuit board with circuits printed on the printed circuit board.

Figure 1:
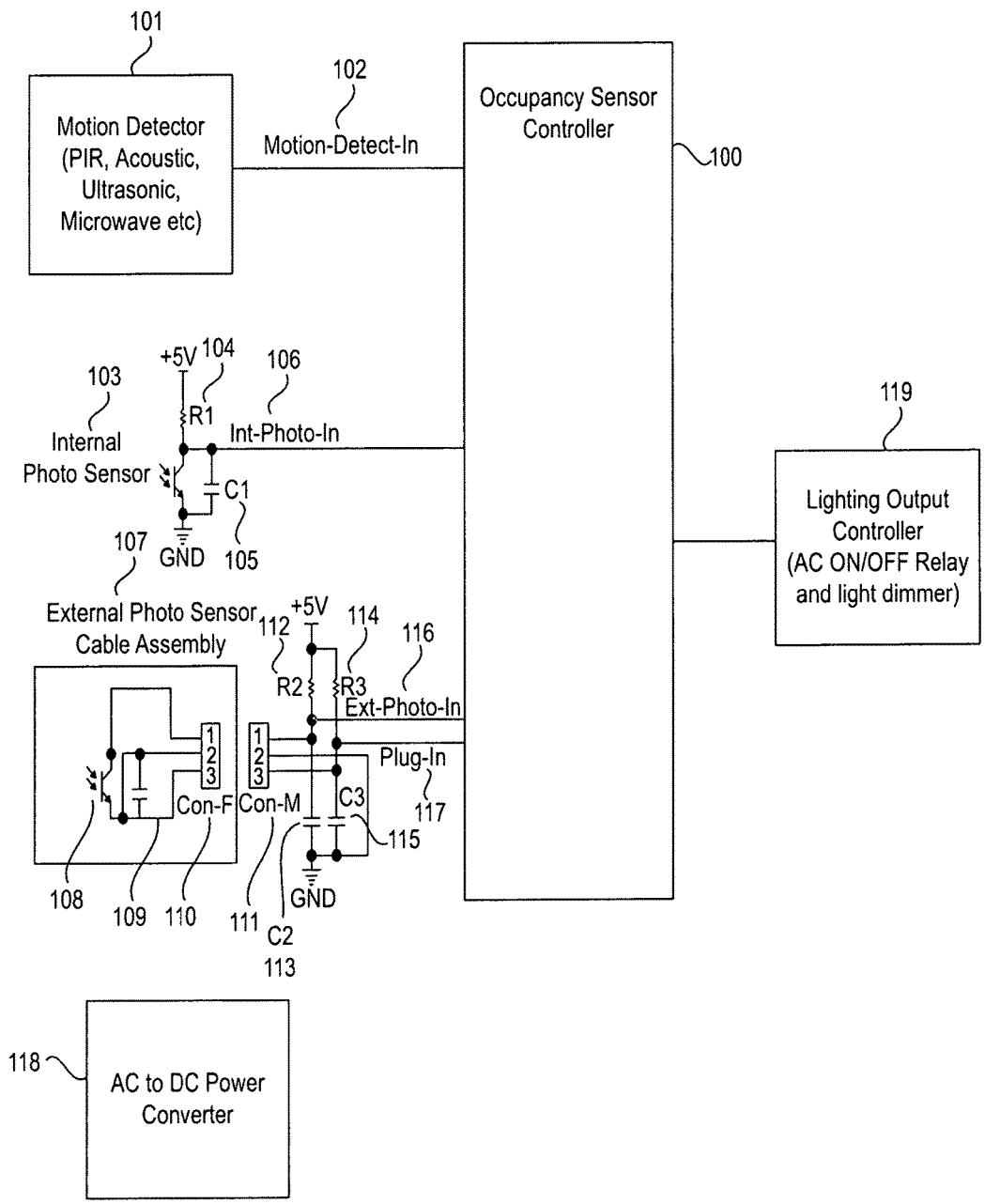
FIG. 1 shows a occupancy sensor circuit block diagram.

FIG. 1 is an occupancy sensor block diagram that shows the block diagram including an AC to DC converter 118, motion detector input 102, internal and external photo sensor inputs 106 and 116, occupancy sensor controller 100 and lighting output controller 119. The AC to DC converter 118 receives power from AC main, usually 90 VAC to 277 VAC at 50 or 60 Hz. The AC to DC converter 118 can generate all necessary isolated low voltage DC power source for the occupancy sensor, such as 5 VDC and 3.3 VDC for logic chips and 12 VDC for relay and dimmer. The AC to DC converter 118 also powers the external bypass photo sensor when the external bypass photo sensor is plugged into the bypass male connector 111. The external bypass photo sensor does not have its own power converter. The motion detector 101 can be a motion detection device such as a PIR sensor, an acoustic sensor, an ultrasonic transceiver or a microwave transceiver. Once the motion detector 101 senses a moving object or objects, the motion detector can send a signal called the MOTION-DETECT-IN signal 102 to the occupancy sensor controller 100.

The occupancy sensor controller 100 has a microcontroller and firmware that can be proprietary or open source. The occupancy sensor controller 100 receives input signals from the motion detector 101, internal main photo sensor 103, external bypass photo sensor cable assembly 107 as well as external bypass photo sensor cable assembly plug in input signal 117. Additionally, the occupancy sensor controller 100 can operate with a remote control such as an infrared remote control also called an IR remote control, or a radio frequency remote control also caught an RF remote control. The internal photo sensor 103 can be a main photo sensor mounted to a housing of the occupancy sensor controller 100. The internal main photo sensor is the default photo sensor that remains operational until they external bypass photo sensor is plugged in.

Signals from the occupancy sensor controller 100 are output to the lighting output controller 119 which then can activate or deactivate the AC power ON or OFF by a mechanical or solid state relay. Built-in dimmers such as analog dimming control voltage 0-10 VDC or AC phase cut as either a leading edge dimmer or a trailing edge dimmer. The leading edge dimmer can be a TRIAC dimmer and a trailing edge dimmer can be an electronics low-voltage dimmer also called an ELV dimmer.

The internal main photo sensor 103 is preferably a built-in device soldered onto the occupancy sensor PC board. The internal main photo sensor 103 has a first resistor R1 104 pull up to +5V DC and a noise filtering capacitor C1 105. The internal main photo sensor will send a signal name INTERNAL-PHOTO-IN 106 to the occupancy sensor controller 100. The noise filtering capacitor C1 105 is connected between a ground and the INTERNAL-PHOTO-IN 106 signal wire.

Figure 2:
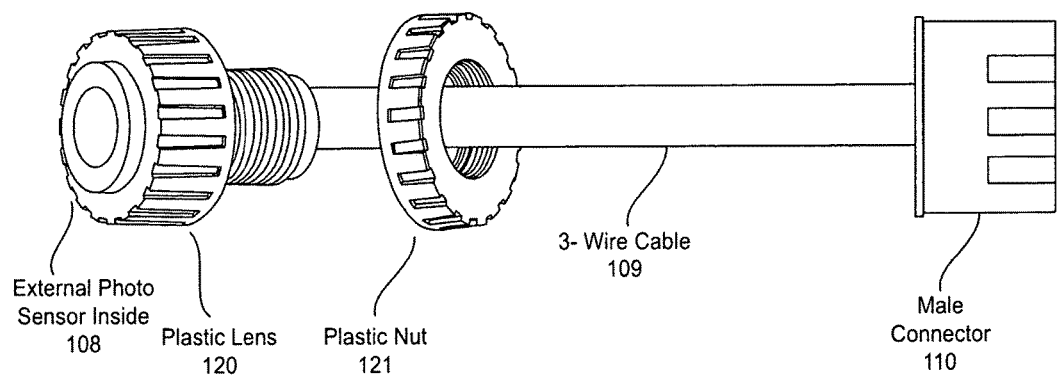
FIG. 2 shows an external bypass photo sensor cable assembly.

An external bypass photo sensor cable assembly can be an external photo sensor cable assembly 107 when it is externally mounted. The external bypass photo sensor cable assembly 107, shown in FIG. 2, can have an external bypass photo sensor 108 connected to a three wire cable 109. The three wire cable connects between the external bypass photo sensor 108 and a female connector 110 labeled as CON-F. The female connector 110 is configured to plug to a mating male connector 111 labeled as CON-M, which is known as bypass connector mounted on the side of the occupancy sensor. The female connector and male connector can be reversed if necessary. The external bypass photo sensor signal 116 that can be named EXT-PHOTO-IN is connected to the first pin of the male connector 111. The first pin of the male connector 111 can be called pin-1 and have a pull up resistor R2 112 for providing a proper direct current voltage and pin-1 can also have a noise filtering capacitor C2 113. The pull up resistor R2 and the noise filtering capacitor C2 are electrically connected to the first pin of the male connector 111. The wire for the external photo sensor signal 116 is connected to an input pin of the occupancy sensor controller 100. Another signal wire carrying a plug in signal 117 called PLUG-IN is connected to the male connector 111 third pin. The male connector 111 third pin called pin-3 is electrically connected to and receives a pull up resistor R3 114 and a noise filtering capacitor C3 115.

When the external bypass photo sensor cable assembly 107 is not plugged in the male connector 111, the plug-in signal 117 named PLUG-IN is pulled up to 5 VDC by the pull up resistor R3 114. When the external bypass photo sensor cable assembly 107 is plugged in the male connector 111, the plug-in signal 117 named PLUG-IN is shorted to ground due to the pin-2 and pin-3 of the female connector 110 being electrically connected together on the external photo sensor cable assembly 107, and pin-2 is connected to the ground. The plug-in signal 117 PLUG-IN will be read as 0 VDC when the external photo sensor cable assembly 107 is plugged in the male connector 111 because the plug-in signal on pin-3 will be shorted to ground due to the junction between pin-2 and pin-3 of the female connector 110, which can be called a female connector pin-2 to pin-3 short to ground junction.

Thus, the external bypass photo sensor cable assembly 107 has a short to ground junction that sets the plug-in signal 117 named PLUG-IN to 0 VDC when the external bypass photo sensor cable assembly connector is connected to the occupancy sensor controller bypass connector. The external photo sensor cable assembly connector is preferably a female connector and the occupancy sensor controller connector is preferably a male connector. Although the three wire cable can have more wires, at least three wires are preferably used. The external photo sensor cable assembly connector preferably has three contacts that simultaneously make electrical contact to the respective three electrical contacts of the occupancy sensor controller connector. The three electrical contacts of the occupancy sensor are preferably three separate sockets that receive three separate pins of the external bypass photo sensor cable assembly 107. The female plug of the external photo sensor cable assembly connector can be made of molded white plastic such that it lacks a conductive ground frame.

When the occupancy sensor controller 100 detects that the plug-in signal 117 is set to ground, firmware located on the occupancy sensor controller ignores the INT-PHOTO-IN signal 106 of the internal main photo sensor 103. The occupancy sensor controller 100 can sample or read the plug-in signal PLUG-IN 117 at predetermined programmed interval to determine whether the external bypass photo sensor cable assembly 107 is plugged in or not. If the external bypass photo sensor cable assembly 107 is not plugged in, then the firmware is configured to read the ambient light level from the internal main photo sensor 103. If the external bypass photo sensor cable assembly 107 is plugged in, then the firmware will read the ambient light level from the external bypass photo sensor 108. The occupancy sensor controller 100 has firmware that provides the override function of the external bypass photo sensor 108.

Preferably, the external photo sensor 108 is installed inside of a protective plastic lens 120 that can be prismatic, fresnel or the like. The user can drill a hole on a mounting surface and secure it with a plastic nut 121 or a similar connector such as a circlip. Alternatively, a preformed knockout hole can be prepunched for preformed on the mounting surface. The preformed knockout hole for the external bypass photo sensor is preferably made opposite the internal main photo sensor, but can also be made to a left, right, top or bottom side of the internal main photo sensor.

The light output controller 119 can turn ON or OFF of the AC power source of the lighting device via a mechanical relay or solid state relay. It can also dim the lighting device with internal built-in dimmers, such as analog dimming control 0-10 VDC voltage, or an AC Phase Cut dimmer in either Leading Edge dimmer (known as TRIAC dimmer) or Trailing Edge dimmer (known as Electronics Low Voltage, or ELV dimmer).

The occupancy sensor has a first mode before the installation of the optional external bypass photo sensor and a second mode after the installation of the optional external bypass photo sensor. In the first mode, the internal main photo sensor is connected to the light controller and configured to send lights enter data to the light controller when the light controller is operating in the first mode. In the second mode, the external bypass photo sensor is plugged in and the like controller automatically switches over to the second mode and ignores the internal main photo sensor or deactivates the internal main photo sensor such as ignores the data read from the internal main photo sensor.

Before installing the occupancy sensor on the light fixture, and installer may consider the environment and surroundings. The internal main photo sensor 103 on the PC board is facing down from the ceiling in the normal installation. The purpose of the internal main photo sensor 103 is to detect the ambient light level, such as sunlight or nearby lighting devices. If the ambient light level is above certain predetermined or programmed levels then the lighting output is dimmed or cutoff to save energy and not allowed to turn back on whenever the motion detector 101 detects any movement under the occupancy sensor. However, if a highly reflective surface is near or directly under the occupancy sensor, the lighting device can be turned ON by the occupancy sensor and may reflect a strong light level toward the internal main photo sensor 103. The occupancy sensor may be confused when the internal main photo sensor 103 receives a signal from a light reflection. The occupancy sensor may malfunction and turn the output light to dim or off. If the output light is dim or off, the internal main photo sensor 103 will detect the ambient light as being too low, and may reactivate the light output. If the light output is reactivated, the internal main photo sensor 103 may detect the ambient is too high leading to a flickering feedback or a continuously dimmed state.

The installer may choose to add the external photo sensor cable assembly 107. The external photo sensor cable assembly 107 has a cable assembly with 3-pin female connector. The installer manually connects the external photo sensor signal EXT-PHOTO-IN 116 and at the same time plug-in detection signal PLUG-IN 117 to the occupancy sensor controller 100 input using the mating male 3-pin bypass connector 111. The external bypass photo sensor 107 includes a cable assembly to allow flexibility of installation directional orientation. The external bypass photo sensor cable assembly 107 is preferably installed pointing to an ambient light source such as windows where sunlight is entering a building. The optionally installed external bypass photo sensor cable assembly 107 eliminates or reduces error feedback by selecting the second mode of operation which allows the new external bypass photo sensor to be pointed toward a more desirable direction for proper ambient light sensing instead of relying on the fixed location internal photo sensor 103 that points directly downward from the installation of the occupancy sensor.

In the first mode which is an ordinary installation without the external bypass photo sensor cable assembly 107 installed, the occupancy sensor firmware only reads the internal main photo sensor 103 input signal INT-PHOTO-IN 106 which is connected to the occupancy sensor controller 100. The occupancy sensor controller 100 can only monitor the activities of the default internal main photo sensor 103 input signal INT-PHOTO-IN 106. However, whenever the external bypass photo sensor cable assembly 107 is installed and signal PLUG-IN 117 is detected at 0 VDC, the firmware will take the external bypass photo sensor 108 input signal EXT-PHOTO-IN 116 as higher priority and continue monitors the external bypass photo sensor 108 instead of the internal main photo sensor 103. This is an automatic mode switch to the external bypass photo sensor 108 function which is defined and coded into the built-in the firmware. The external bypass photo sensor 108 immediately overrides of the internal main photo sensor 103 without further interaction necessary from a human installer. When both internal main photo sensor 103 and external bypass photo sensor 108 are installed, the external bypass photo sensor 108 is assigned a higher priority and will be monitored as the primary ambient light sensor. The external bypass photo sensor cable assembly 107 is installed or not based on the individual installer's or user's judgment. If the external bypass photo sensor cable assembly 107 is not used, and a feedback error appears at a later time, the user can plug-in the external bypass photo sensor cable assembly 107 at anytime after the initial installation to convert from the first mode to the second mode of operation.

As an alternate embodiment of the present invention, the external bypass photo sensor can be plugged into a like controller that does not have a daylight harvesting photo sensor as a pluggable upgrade. This could be in a situation such as when the main internal photo sensor is not included, later malfunctions or is missing. The external photo sensor cable assembly 107 can be installed in any user desired orientation and remain a valid solution for any occupancy sensor that currently lacks an internal main photo sensor 103, as long as the firmware is made compatible. The alternate feature thus transform an occupancy sensor without a daylight harvesting photo sensor into an occupancy sensor that has an option to add a daylight harvesting photo sensor.

Figure 3:
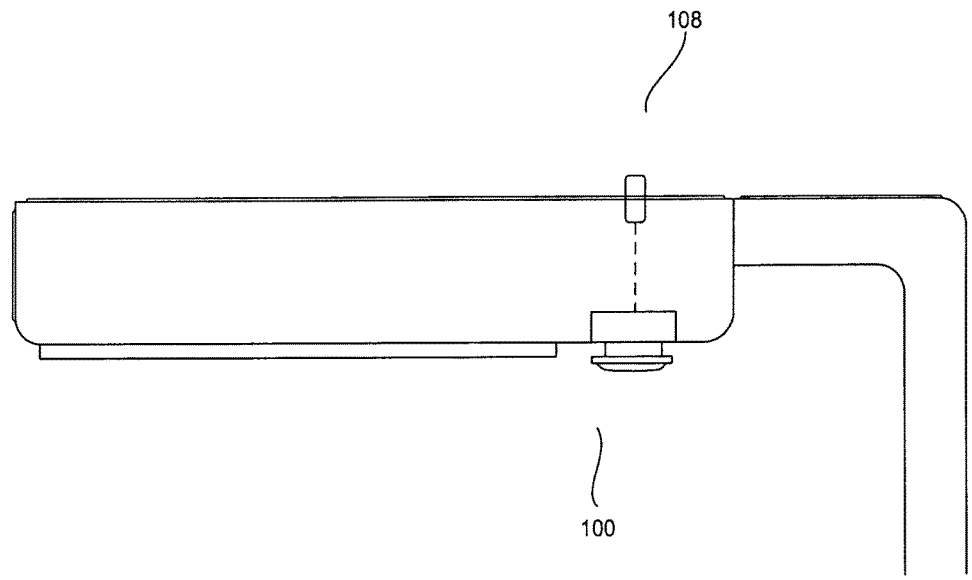
FIG. 3 shows an installed external bypass photo sensor mounted on an upper portion of the light fixture housing above the occupancy sensor controller 100.

As seen in FIG. 3, the external bypass photo sensor 108 is external to the occupancy sensor controller housing. The internal main photo sensor 103 is internal to the occupancy sensor controller housing. The internal main photo sensor 103 is mounted to the occupancy sensor controller housing, but the external bypass photo sensor 108 is not mounted to the occupancy sensor controller housing. The external bypass photo sensor 108 is set apart from the occupancy sensor controller housing by an optional external bypass photo sensor cable assembly 107. The external bypass photo sensor 108 can be mounted on a top sidewall of the light fixture while the occupancy sensor controller 100 and the housing of the occupancy sensor controller is mounted on the bottom sidewall of the light fixture. As seen in FIG. 3, the external bypass photo sensor 108 is mounted on an opposite side of the light fixture housing as the occupancy sensor controller 100 and the housing of the occupancy sensor controller. The external bypass photo sensor 108 remains connected to the occupancy sensor controller 100 and the housing of the occupancy sensor controller by the external bypass photo sensor cable assembly 107. The external bypass photo sensor cable assembly 107 is preferably at least several centimeters long. The light fixture housing is preferably opaque so that light emitted from the light fixture is at least partially shaded by the light fixture housing.

The invention claimed is:

1. An occupancy sensor with a bypass photo sensor comprising:

an external installed light fixture with a lamp and a power supply, wherein the occupancy sensor installed on the light fixture has a plurality of sidewalls defining a light fixture housing;

an internal main photo sensor is mounted on a first sidewall of the light fixture;

a light controller, wherein the internal main photo sensor is connected to the light controller and configured to send light sensor data to the light controller when the light controller is operating in a first mode; and an external bypass photo sensor is optionally mounted on a second sidewall of the light fixture, wherein the external bypass photo sensor cable assembly is configured to connect to the light controller and bypass the internal main photo sensor when the external bypass photo sensor cable assembly is installed to the light controller and the light controller is operating in a second mode, wherein the light controller is electrically connected to the external bypass photo sensor at least three contacts of the light controller namely a first contact, a second contact and a third contact, wherein the first contact is used to send light sensor data to the light controller and wherein the second contact and the third contact are electrically connected so that they are shorted relative to each other, wherein the light controller is configured to sense the short between the second and third contact which activates a bypass of the internal main photo sensor by automatically deactivating the internal main photo sensor and switching over to the external bypass photo sensor, whereby the external bypass photo sensor is automatically detected when it is plugged in and automatically overrides the internal main photo sensor for monitoring.

2. The occupancy sensor with a bypass photo sensor of claim 1, wherein the internal main photo sensor is a photo sensor and the external bypass photo sensor is also a photo sensor, wherein the main sensor further includes:

a built-in isolated AC-to-DC power converter;

a motion detector having passive infrared, acoustic, ultrasonic, microwave sensor technology, wherein the light controller is a main occupancy sensor controller with a microcontroller and firmware, wherein the internal photo sensor mounted at least partially within the light fixture, wherein the external bypass photo sensor includes a cable assembly with a connector, wherein the at least three contacts are mounted on the connector.

3. The occupancy sensor with a bypass photo sensor of claim 1, wherein the light controller further includes a mechanical or solid-state relay to control output to a lighting device by turning on and turning off alternating current line power; and wherein a pair of dimming wires control an industrial standard 0-10 VDC dimmable lighting device, wherein dimming is controlled by a built-in AC phase cut dimmer in either leading edge dimmer, also called a TRIAC dimmer or a trailing edge dimmer also known as an electronics low voltage dimmer.

4. The occupancy sensor with a bypass photo sensor of claim 1, wherein the light controller has a light controller internal fixed location, wherein the light controller has a light controller housing upon which the occupancy sensor is mounted, wherein the occupancy sensor includes an internal main photo sensor, wherein the external bypass photo sensor is external to the light controller and external to the light fixture housing.

5. The occupancy sensor with a bypass photo sensor of claim 1, wherein a direction of the light output of the lamp, and a direction of the bypass sensor are different, whereby feedback flickering is reduced.

6. The occupancy sensor with a bypass photo sensor of claim 1, wherein the external bypass photo sensor is configured to add a photo sensor for daylight harvesting, wherein the photo sensor is connected to the light controller, wherein the light controller lowers light output when an ambient light level is reached a pre-programmed light level.

7. The occupancy sensor with a bypass photo sensor of claim 1, wherein the internal main photo sensor is configured to add a photo sensor for daylight harvesting, wherein the photo sensor is connected to the light controller, wherein the light controller lowers light output when an ambient light level is reached a pre-programmed light level.

8. A bypass sensor comprising:

an internal main photo sensor;

a light controller, wherein the internal main photo sensor is connected to the light controller and configured to send light sensor data to the light controller when the light controller is operating in a first mode;

an external bypass photo sensor is optionally mounted on a second sidewall of a light fixture, wherein the external bypass photo sensor cable assembly is configured to connect to the light controller and bypass the internal main photo sensor when the external bypass photo sensor cable assembly is installed to the light controller and the light controller is operating in a second mode, wherein the light controller is electrically connected to the external bypass photo sensor at least three contacts of the light controller namely a first contact, a second contact and a third contact, wherein the first contact is used to send light sensor data to the light controller and wherein the second contact and the third contact are electrically connected so that they are shorted relative to each other, wherein the light controller is configured to sense the short between the second and third contact which activates a bypass of the internal main photo sensor by automatically deactivating the internal main photo sensor and switching over to the external bypass photo sensor, whereby the external bypass photo sensor is automatically detected when it is plugged in and automatically overrides the internal main photo sensor for monitoring; and a built-in isolated AC-to-DC power converter;

a motion detector having passive infrared, acoustic, ultrasonic, microwave sensor technology, wherein the light controller is a main occupancy sensor controller with a microcontroller and firmware, wherein the external bypass photo sensor includes a cable assembly with a connector, wherein the at least three contacts are mounted on the connector.

9. The bypass sensor of claim 8, wherein the light controller further includes a mechanical or solid-state relay to control output to a lighting device by turning on and turning off alternating current line power; and wherein a pair of dimming wires control an industrial standard 0-10 VDC dimmable lighting device, wherein dimming is controlled by a built-in AC phase cut dimmer in either leading edge dimmer, also called a TRIAC dimmer or a trailing edge dimmer also known as an electronics low voltage dimmer.

10. The bypass sensor of claim 8, wherein the light controller has a light controller internal fixed location, wherein the light controller has a light controller housing upon which the occupancy sensor is mounted, wherein the occupancy sensor includes an internal main photo sensor, wherein the external bypass photo sensor is external to the light controller and external to a light fixture housing.

11. The bypass sensor of claim 8, wherein a direction of the light output of the lamp, and a direction of the bypass sensor are different, whereby feedback flickering is reduced.

12. The bypass sensor of claim 8, wherein the external bypass photo sensor is configured to add a photo sensor for daylight harvesting, wherein the photo sensor is connected to the light controller, wherein the light controller lowers light output when an ambient light level is reached a pre-programmed light level.

13. The bypass sensor of claim 8, wherein the internal main photo sensor is configured to add a photo sensor for daylight harvesting, wherein the photo sensor is connected to the light controller, wherein the light controller lowers light output when an ambient light level is reached a pre-programmed light level.

* * * * *